April 29, 1924.

J. M. LINE 1,492,254

FOLDING COT OR BED

Filed June 3, 1922

Inventor
John M. Line,
By William W. Deane,
his Attorney

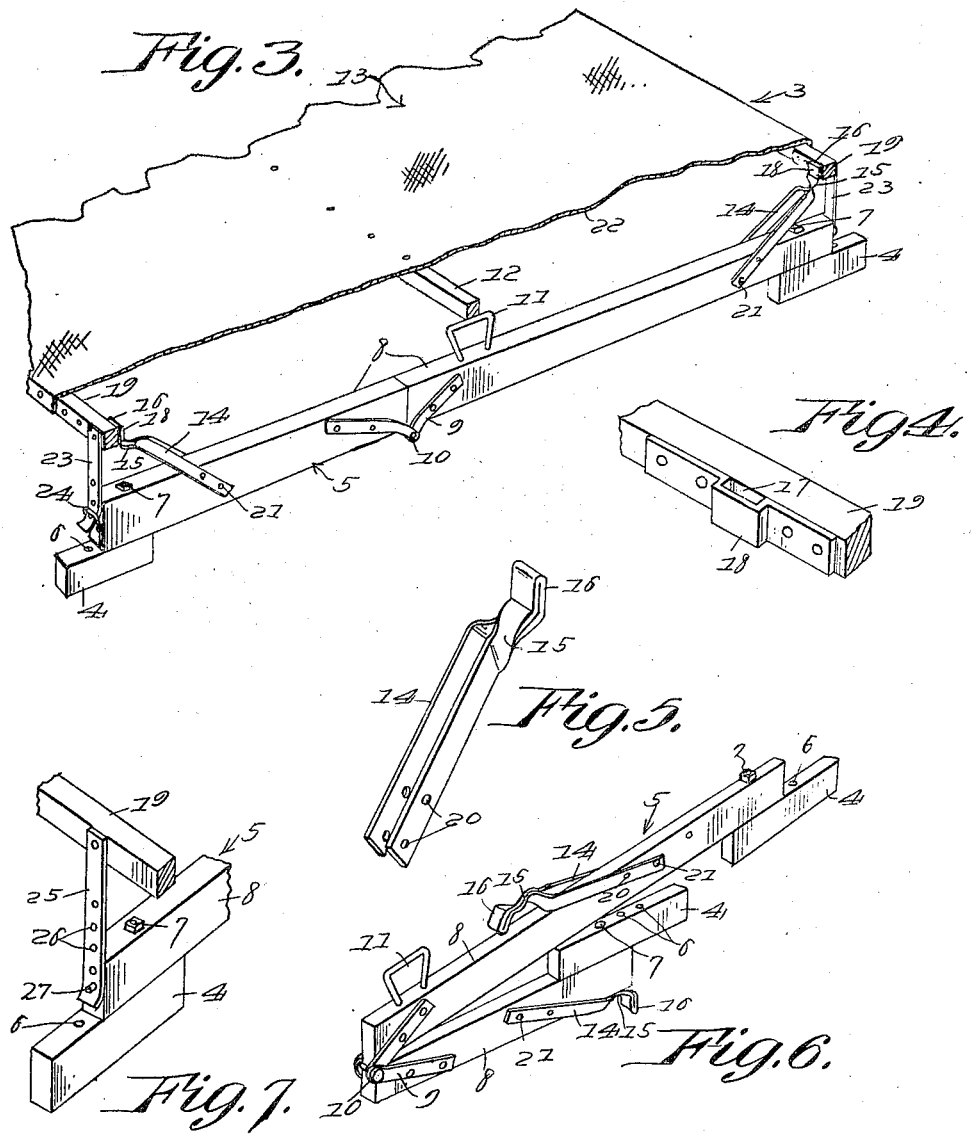

Patented Apr. 29, 1924.

1,492,254

UNITED STATES PATENT OFFICE.

JOHN M. LINE, OF SPRINGFIELD, MISSOURI.

FOLDING COT OR BED.

Application filed June 3, 1922. Serial No. 565,523.

*To all whom it may concern:*

Be it known that I, JOHN M. LINE, a citizen of the United States, residing at Springfield, in the county of Greene and State of Missouri, have invented certain new and useful Improvements in Folding Cots or Beds, of which the following is a specification.

This invention relates to improvements in folding cots or beds and more particularly to a cot adapted to be erected within an automobile body and to be supported by the latter, so that an automobile may be used for camping purposes without employing a tent or the like.

The primary object of the invention is to furnish a folding cot of inexpensive construction, which may be folded into a small bundle to facilitate storage or transportation of the same, and which when erected will provide a rigid construction capable of sustaining heavy weights.

Another object of the invention is to provide an improved folding cot which may be speedily erected or folded.

A further object of the invention is to provide a folding cot capable of adjustment to accommodate automobile bodies of various widths.

With the foregoing objects outlined, and with other objects in view, which will appear as the description proceeds, the invention consists in the novel features hereinafter described in detail, illustrated in the accompanying drawing, and more particularly pointed out in the appended claims.

Referring to the drawings:

Fig. 3 is a detail perspective view partly in section of a portion of the cot and illustrating the manner in which the body of the cot is mounted on the cross bars.

Fig. 4 is a perspective view of a portion of one of the side rails and the clip or strap employed in connecting the same to one of the legs.

Fig. 5 is a detail perspective view of one of the pivoted or folding legs employed in connecting the body of the cot to the cross bars.

Fig. 6 is a perspective view of one of the cross bars and its attached parts in folded condition.

Fig. 7 is a detail perspective view illustrating a modified fastening means for connecting a side rail of the cot body to one end of a cross bar.

Figure 1:
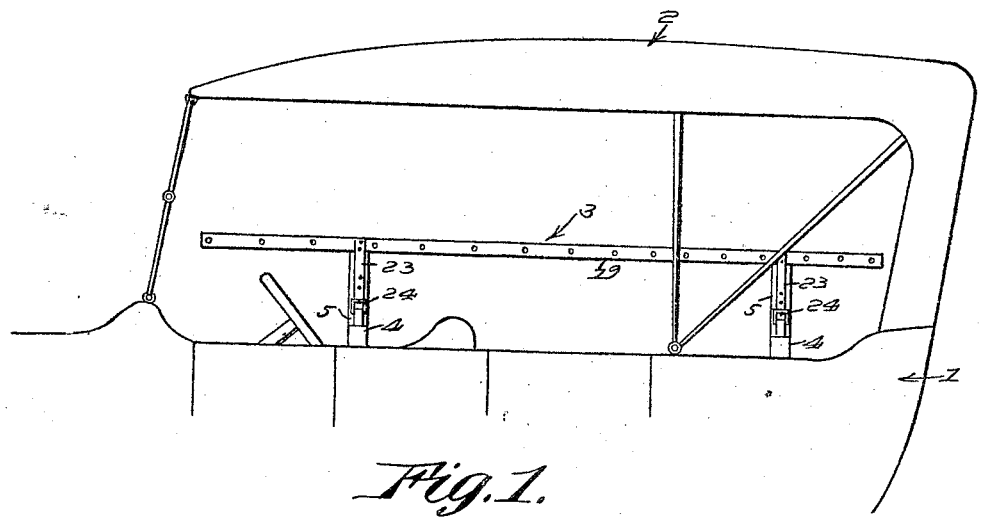
Figure 1 is a side view of a portion of an automobile with my improved cot mounted therein.

In the drawing, 1 designates the tonneau of an automobile provided with a top 2. As illustrated in Fig. 1, my improved cot 3 may be placed between the tonneau and top, and the feet 4 of the cross bars of the cot will rest on the upper edge of the tonneau.

While the cot is specifically devised for use with automobiles, it is apparent that the same may be supported by or mounted on any other suporting surface, such as the floor of a tent or the like.

The cot consists of two cross bars 5 each provided at its ends with the feet 4. The feet are preferably provided with a series of apertures 6 to receive a bolt 7 and it will be apparent that the length of each cross bar may be varied by adjusting the feet 4. In this manner the cot may be adapted to fit automobile bodies of various widths. Each cross bar 5 preferably consists of two pieces 8 connected together by a hinge 9 having a pintle 10 arranged below the longitudinal axis of the cross bar, so that the hinge forms a knuckle joint to prevent the outer ends of the pieces 8 from moving upwardly. The cross bar 5 is provided with a supporting member 11 which is preferably of U shape and extends upwardly from the cross bar to provide a support for the central longitudinal rail 12 of the bed body 13. Each cross bar is provided near its ends with pivotally mounted folding legs 14, one of which is shown in detail in Fig. 5. Each leg preferably consists of a piece of strap metal bent into U shape. The folded end of the strap has the opposite sides abutting each other and is twisted as shown at 15 to provide an extension lug 16 adapted to be inserted in a socket 17 formed by placing a metal strap 18 on a side rail 19 of the bed body 13. The leg 14 is provided with two pairs of apertures 20 (see Fig. 5), either pair of which is adapted to receive a pin 21 employed in pivotally and adjustably connecting the leg to the cross bar 5 (see Fig. 6).

From the drawings it will be noted that I preferably employ two cross bars 5 each having two legs 14, and when these legs are in the position illustrated in Fig. 3 their lugs 16 may be readily inserted in the sockets 17 in order to connect the side rails 19 to the cross bars.

In order to hold the bed body 13 in proper position, and to tension the fabric sheet 22 forming part of the same, I provide depending straps 23 on the side rails 19 and connect these straps to buckles 24 secured to the ends of the cross bars 5.

Instead of using the strap and buckle connection, I may, as shown in Fig. 7, employ a flexible metal strap 25 having apertures 26 adapted to engage a pin 27 fixed at the end of the cross bar 5.

Figure 2:
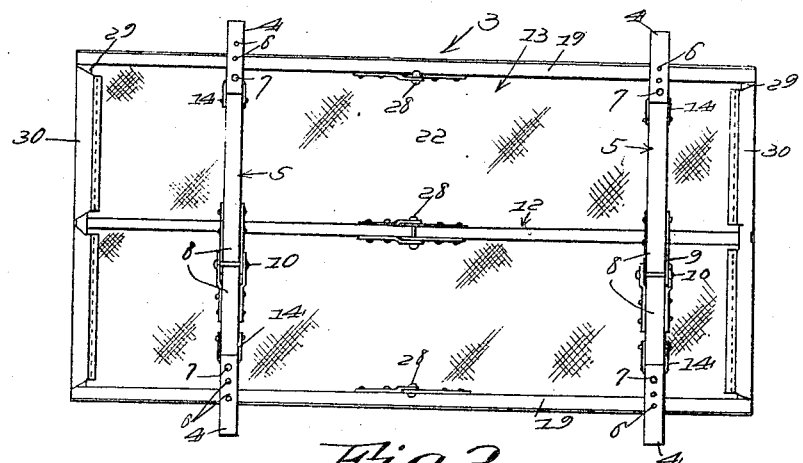
Fig. 2 is a bottom plan view of the cot in assembled condition.

As shown in Fig. 2, the central longitudinal rail 12 and side rails 19 are each formed of two pieces of material connected together by hinges 28, and the pintles of these hinges are preferably arranged below the rails in the same manner as the pintle 10, in order to prevent the rails from buckling.

The end bars 29 of the cot are of the type which detachably engage the ends of the side rails 19, and these end bars pass through loops 30 provided at the ends of the fabric sheet 22.

When it is desired to use the cot, the cross bars are unfolded into the condition shown in Figure 3, and if the cot is to be used with an automobile, the feet 4 at the ends of the cross bar are set on the upper edge of the tonneau in spaced relation. Then the body 13 of the cot is unfolded and the lugs 16 are placed in the sockets 17. At this time the central rail 12 will rest on the supporting members 11. Then by tightening the straps 23, the fabric sheet 22 may be placed in tension and all the parts will be held in rigid relation.

The cot may be folded in a manner which will be apparent from the foregoing description and it is not deemed necessary to describe such operation here.

While I have illustrated the preferred form of the invention, it is obvious that various changes may be made in the details disclosed without departing from the spirit of the invention as expressed in the following claims.

What I claim and desire to secure by Letters-Patent is:

1. A folding cot adapted to be placed in open condition within the body of an automobile and including a base formed of a plurality of cross rails provided at their ends with feet adapted to rest on the upper edge of an automobile tonneau, each cross rail formed of a plurality of sections hingedly connected together and the pintle of the hinge being arranged below the longitudinal axis of the rail to prevent upward movement of the rail, legs having their lower ends pivotally connected to each cross rail and adapted to be folded on to the cross rail with which they are associated, vertical lugs arranged at the upper ends of said legs, a folding bed bottom adapted to be supported by the base and including a knock-down rectangular frame carrying a rectangular sheet of flexible fabric, said frame including longitudinal rails and cross rails, sockets fixed to the inner sides of the longitudinal rails and adapted to detachably engage the vertical lugs at the upper ends of the legs, and adjustable straps connecting the longitudinal rails to the ends of the cross rails of the base.

2. A folding cot as claimed in claim 1 in which the lower end of said legs are adjustably connected to the cross rail to permit shortening or lengthening of the leg.

3. In a cot, the combination with a cross rail, of a leg formed from a length of metal bent upon itself intermediate the ends thereof to provide a pair of parallel branches, means pivotally connecting the lower terminal portions of said branches to opposite sides of said cross rail, the upper terminal portions of said branches being flatly in contact and formed with half twists defining an attaching portion, and a side rail having a socket member detachably receiving the attaching portion of said leg.

In testimony whereof I affix my signature.

JOHN M. LINE. [L. S.]